United States Patent
Wang et al.

(10) Patent No.: US 9,250,317 B1
(45) Date of Patent: Feb. 2, 2016

(54) METHODS AND APPARATUS FOR 3D RADAR DATA FROM 2D PRIMARY SURVEILLANCE RADAR AND PASSIVE ADJUNCT RADAR

(71) Applicant: Raytheon Canada Limited, Ottawa (CA)

(72) Inventors: Jian Wang, Waterloo (CA); Eli Brookner, Lexington, MA (US); Peter R. Drake, Northborough, MA (US); Bradley Fournier, Waterloo (CA); Anthony M. Ponsford, Ottawa (CA); Yueh-Chi Chang, Northborough, MA (US)

(73) Assignee: RAYTHEON CANADA LIMITED, Ottawa, CA (US)

( * ) Notice: Subject to any disclaimer, the term of this patent is extended or adjusted under 35 U.S.C. 154(b) by 574 days.

(21) Appl. No.: 13/721,233

(22) Filed: Dec. 20, 2012

(51) Int. Cl.
   G01S 13/00 (2006.01)
   G01S 13/89 (2006.01)

(52) U.S. Cl.
   CPC .............. *G01S 13/006* (2013.01); *G01S 13/89* (2013.01)

(58) Field of Classification Search
   CPC ....... G01S 13/006; G01S 13/06; G01S 13/87; G01S 13/89
   USPC ........................................... 342/90, 125, 179
   See application file for complete search history.

(56) References Cited

U.S. PATENT DOCUMENTS

| | | |
|---|---|---|
| 3,737,902 A | 6/1973 | O'Hagan et al. |
| 4,961,075 A | 10/1990 | Ward |
| 6,281,574 B1 | 8/2001 | Drake et al. |
| 6,314,366 B1 | 11/2001 | Farmakis et al. |
| 6,653,971 B1 | 11/2003 | Guice et al. |
| 6,690,296 B2 | 2/2004 | Corwin et al. |
| 6,717,545 B2 | 4/2004 | Dizaji et al. |
| 6,822,606 B2 | 11/2004 | Ponsford et al. |
| 6,867,731 B2 | 3/2005 | Dizaji et al. |
| 7,151,483 B2 | 12/2006 | Dizaji et al. |
| 7,242,343 B1 * | 7/2007 | Woodell .................... G01S 7/41 342/26 B |
| 7,567,203 B2 | 7/2009 | Dizaji et al. |
| 7,626,535 B2 | 12/2009 | Ding et al. |
| 7,675,458 B2 | 3/2010 | Hubbard et al. |
| 7,683,734 B2 | 3/2010 | Catoiu |
| 7,741,992 B2 | 6/2010 | Wang et al. |
| 7,773,028 B2 | 8/2010 | Chan et al. |
| 7,791,413 B2 | 9/2010 | Catoiu et al. |
| 7,928,808 B2 | 4/2011 | Chan |
| 7,948,429 B2 | 5/2011 | Drake et al. |
| 8,004,452 B2 | 8/2011 | Rolfe et al. |

(Continued)

OTHER PUBLICATIONS

Notification of Transmittal of the International Search Report and the Written Opinion of the International Searching Authority, or the Declaration, PCT/US2007/022153 date of mailing Oct. 14, 2008, 5 pages.

(Continued)

*Primary Examiner* — Timothy A Brainard
(74) *Attorney, Agent, or Firm* — Daly, Crowley, Mofford & Durkee, LLP

(57) ABSTRACT

Methods and apparatus for combining radar signals of a two-dimensional primary radar covering a surveillance area and a passive adjunct radar to provide three-dimensional data for targets and weather. In exemplary embodiments, high beam and low beam data from the primary radar and elevation data from the adjunct radar can be used to mitigate interference from clutter, such as wind farms.

20 Claims, 13 Drawing Sheets

(56) References Cited

U.S. PATENT DOCUMENTS 8,344,937 B2    1/2013   Drake et al.
2004/0233098 A1  11/2004  Millikin et al.

OTHER PUBLICATIONS

Written Opinion of the International Searching Authority, PCT/US2007/022153 date of mailing Oct. 14, 2008, 8 pages.

Notification Concerning Transmittal of International Preliminary Report on Patentability (Chapter 1 of the Patent Cooperation Treaty), International Filing Date Oct. 17, 2007, 8 pages.

Millikin R L et al.,: "Use of an adapted marine radar for the short-range detection and tracking of small birds in flight", IGARSS 2001. IEEE 2001 International Geoscience and Remote Sensing Symposium. Syndey, Australia, Jul. 9-13, 2001; [IEEE International Geoscience and Remote Sensing Symposium], New York, NY: IEEE, US. vol. 5, Jul. 9, 2001, pp. 2010-2012, XP010572331. ISBN: 978-0-7803-7031-9.

Valin P et al.,: "Initiating 3-D Air Target Tracks from 2-D Naval Radar Sensor Reports", Proceedings of the SPIE—The International Society for Optical Engineering, SPIE, Bellingham, VA; US, vol. 4048, Apr. 24, 2000, pp. 369-377, XP008016818.

\* cited by examiner

METHODS AND APPARATUS FOR 3D RADAR DATA FROM 2D PRIMARY SURVEILLANCE RADAR AND PASSIVE ADJUNCT RADAR

BACKGROUND

As is known in the art, there is degradation in the performance of two-dimensional (2D) Air Surveillance Radars (ASR) when tracking aircraft near or above windfarms and when providing coverage at low elevation angles for targets such as ground targets, marine vessels, low flying aircraft and unmanned aerial vehicles (UAVs), and the like. It is also challenging for these 2D radars to provide an estimate of the height of a target.

The presence of windfarms within the field of view of primary surveillance radars (PSR) degrades performance since echoes originating from these structures can have similar characteristics to those of an aircraft (including Doppler signature) and can be significantly stronger in amplitude. If not removed, these unwanted echoes can result in false tracks, missed tracks, track seduction and false weather.

Conventional attempts to mitigate the effects of wind farms include Sensitivity Time Control (STC), Range Azimuth Gating (RAG), Track Initiation Inhibit, Velocity Editing, and Plot Amplitude Threshold (PAT). Other known systems use discrimination techniques applied at pre-detection, detection and post detection stages of the radar signal processing chain. However, some of these known techniques may reduce radar sensitivity.

It is noted that in the United States wind energy currently provides about two percent of U.S. power generation. There is a plan to increase this to twenty percent by the year 2030. Unfortunately, there is a relatively high correlation between the location of windfarms and ASR radar sites. Thus, there is a need to address the performance degradation of ASR radars in the vicinity of windfarms.

SUMMARY

Exemplary embodiments of the invention enhance the capability of ASR radars to detect aircraft in the vicinity of windfarms, and/or detect surface and low altitude targets, by providing a passive adjunct radar that can be combined with primary surveillance radar to obtain three-dimensional (3D) data for a surveillance area. This data can be used to distinguish between unwanted low altitude clutter returns, such as wind turbines, from those of aircraft. This is achieved without negatively impacting the performance of the ASR radar's primary mission.

In general, exemplary embodiments of the invention are directed to suppressing wind turbine clutter and enhancing the performance of primary surveillance radars (PSRs). Exemplary embodiments can also add or enhance surface and low altitude detection capability to the radar. In addition, exemplary embodiments of the invention can provide height information of aircraft to air traffic controllers. Height information is increasingly desirable as UAVs become more prevalent in controlled airspace. In addition, exemplary embodiments of the invention can provide height profile of weather (3D weather) to air traffic controllers. In addition, exemplary embodiments of the invention can provide improved coverage or sensitivity of the PSR radar by integrating the data from both PSR and adjunct radar. When the data are coherently integrated, there is a 3 dB improvement on the signal to noise ratio (SNR). When the data are incoherently integrated, the improvement on SNR can be as high as 2.5 dB.

In one aspect of the invention, a method comprises: transmitting radar signals using a two-dimensional primary radar to cover a surveillance area, receiving return from the transmitted radar signals at the primary radar comprising at least a low beam of a high beam and the low beam, receiving return from the transmitted radar signal at a passive adjunct radar comprising elevation beam data, synchronizing the primary radar and the adjunct radar, combining range and azimuth data from the primary radar with elevation data from the adjunct radar to provide three-dimensional data for targets and weather, and integrating data from the primary radar with data from adjunct radar to improve coverage of the radar.

The method can further include one or more of the following features: the low beam data comprises targets and interference and wherein the some elevation beam data contains interference and not targets, performing adaptive filtering of the low beam data and the elevation beam data to remove the interference, using a land clutter path and a no-land clutter path for the elevation beam data, the land-clutter path includes CFAR processing, adaptively using weather clutter cancellation in the no-land clutter path, the interference is generated by a wind farm, aligning the primary radar and the adjunct radar to the same azimuth while scanning, performing height estimation for a target using the elevation beam data, performing monopulse processing for the height estimation, performing maximum likelihood estimation for the height estimation, performing 3D weather estimation using the adjunct radar data, and/or the primary radar and the adjunct radar are located to form a bistatic configuration.

In another aspect of the invention, an article comprises: a computer-readable medium containing non-transitory stored instructions that enable a machine to perform: transmitting radar signals using a two-dimensional primary radar to cover a surveillance area, receiving return from the transmitted radar signals at the primary radar comprising at least a low beam of a high beam and the low beam, receiving return from the transmitted radar signal at a passive adjunct radar comprising elevation beam data, synchronizing the primary radar and the adjunct radar, combining range and azimuth data from the primary radar with elevation data from the adjunct radar to provide three-dimensional data for targets and weather, and integrating data from the primary radar with data from adjunct radar to improve coverage of the radar.

The article can further include code for providing one or more of the following features: the low beam data comprises targets and interference and wherein the some elevation beam data contains interference and not targets, performing adaptive filtering of the low beam data and the elevation beam data to remove the interference, using a land clutter path and a no-land clutter path for the elevation beam data, the land-clutter path includes CFAR processing, adaptively using weather clutter cancellation in the no-land clutter path, the interference is generated by a wind farm, aligning the primary radar and the adjunct radar to the same azimuth while scanning, performing height estimation for a target using the elevation beam data, performing monopulse processing for the height estimation, performing maximum likelihood estimation for the height estimation, performing 3D weather estimation using the adjunct radar data, and/or the primary radar and the adjunct radar are located to form a bistatic configuration.

In a further aspect of the invention, a radar system comprises: a two-dimensional primary radar to cover a surveillance area by transmitting radar signals, an antenna to receive return from the transmitted radar signals at the primary radar comprising at least a low beam of a high beam and the low beam, an adjunct radar having antenna to receive return from the transmitted radar signal comprising elevation beam data, a processor, and a memory coupled to the processor, the processor and the memory configured to: synchronize the primary radar and the adjunct radar, combine range and azimuth data from the primary radar with elevation data from the adjunct radar to provide three-dimensional data for targets and weather, and integrate data from the primary radar with data from adjunct radar to improve coverage of the radar.

The system can include one or more of the following features: the low beam data comprises targets and interference and wherein the some elevation beam data contains interference and not targets, perform adaptive filtering of the low beam data and the elevation beam data to remove the interference, use a land clutter path and a no-land clutter path for the elevation beam data, the land-clutter path includes CFAR processing, adaptively use weather clutter cancellation in the no-land clutter path, the interference is generated by a wind farm, align the primary radar and the adjunct radar to the same azimuth while scanning, perform height estimation for a target using the elevation beam data, perform monopulse processing for the height estimation, performing maximum likelihood estimation for the height estimation, perform 3D weather estimation using the adjunct radar data, and/or the primary radar and the adjunct radar are located to form a bistatic configuration.

BRIEF DESCRIPTION OF THE DRAWINGS

The foregoing features of this invention, as well as the invention itself may be more fully understood from the following description of the drawings in which.

DETAILED DESCRIPTION

Exemplary embodiments of the invention include a passive adjunct radar, such as a phased array radar or stacked beam radar, which can be combined with a two-dimensional (2D) primary surveillance radar (PSR) to provide three-dimensional (3D) surveillance including both air and surface tracks. The data can also be processed for filtering and removing unwanted echoes originating from low altitude targets, such as wind turbines. The data from both PSR and adjunct radar can be integrated to improve radar coverage. In one embodiment, height information for these detections can be determined from the combined radar data. In another embodiment, the system can be optimized to detect and track surface and low flying small targets such as UAVs and ships. In one particular embodiment, the system provides three-dimensional (3D) weather detection.

In general, a surveillance area is illuminated by a primary surveillance radar (PSR). The radar return is simultaneously received by both the PSR and the passive adjunct radar, which generates multiple elevation beams to separate aircraft from low altitude targets and clutter. With this arrangement, air targets can be detected and tracked in the background of returns originating from wind turbines. This effectively converts a PSR, which is a 2D radar with a fan beam, into a low cost 3D radar.

In one embodiment, the system can integrate data from both PSR and passive adjunct radar to improve the SNR and thereafter the coverage. In one embodiment, the system provides height estimation for aircraft and weather. As will be readily appreciated, height estimation is highly desirable for tracking targets that do not have transponders, such as small aircraft, UAVs, and birds. In one embodiment the system can simultaneously detect and track surface and air targets. In another embodiment, one system can simultaneously address multiple windfarms that are geographically separated from one and another. As a comparison, multiple infill radars and data fusion would be required with each radar gap-filling an individual windfarm.

Figure 1:
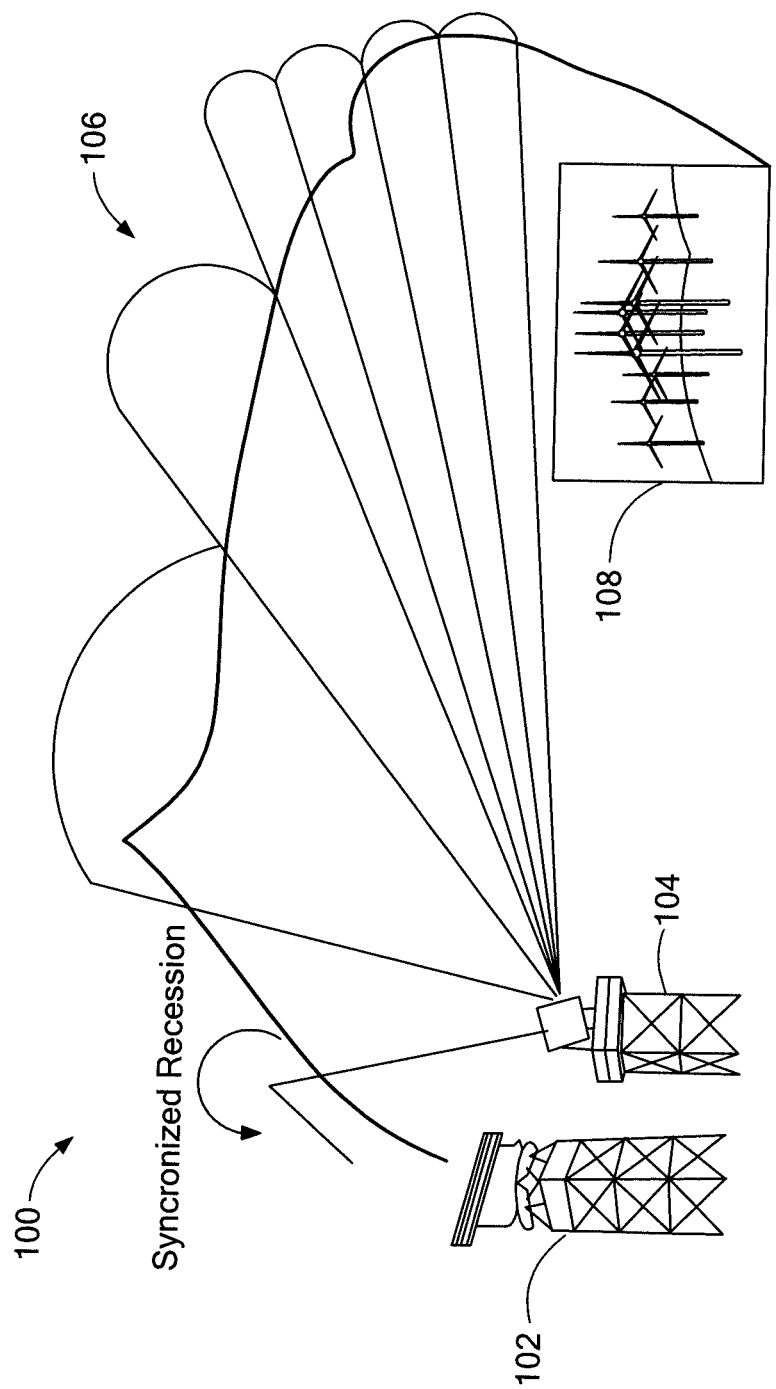
FIG. 1 is a schematic representation of a radar system having a primary radar and a passive adjunct radar to provide 3D data.

FIG. 1 shows an exemplary radar system 100 having a primary surveillance radar (PSR) 102 and a passive adjunct radar system 104 to cover a surveillance area 106 and mitigate the effects of a windfarm 108 in the surveillance area. The exemplary embodiment of FIG. 1 is a monostatic configuration. As described more fully below, a 2D PSR, which can determine range and azimuth for a target, is converted to a 3D radar by using the passive adjunct radar system 104, which can determine elevation data for the target.

Figure 2:
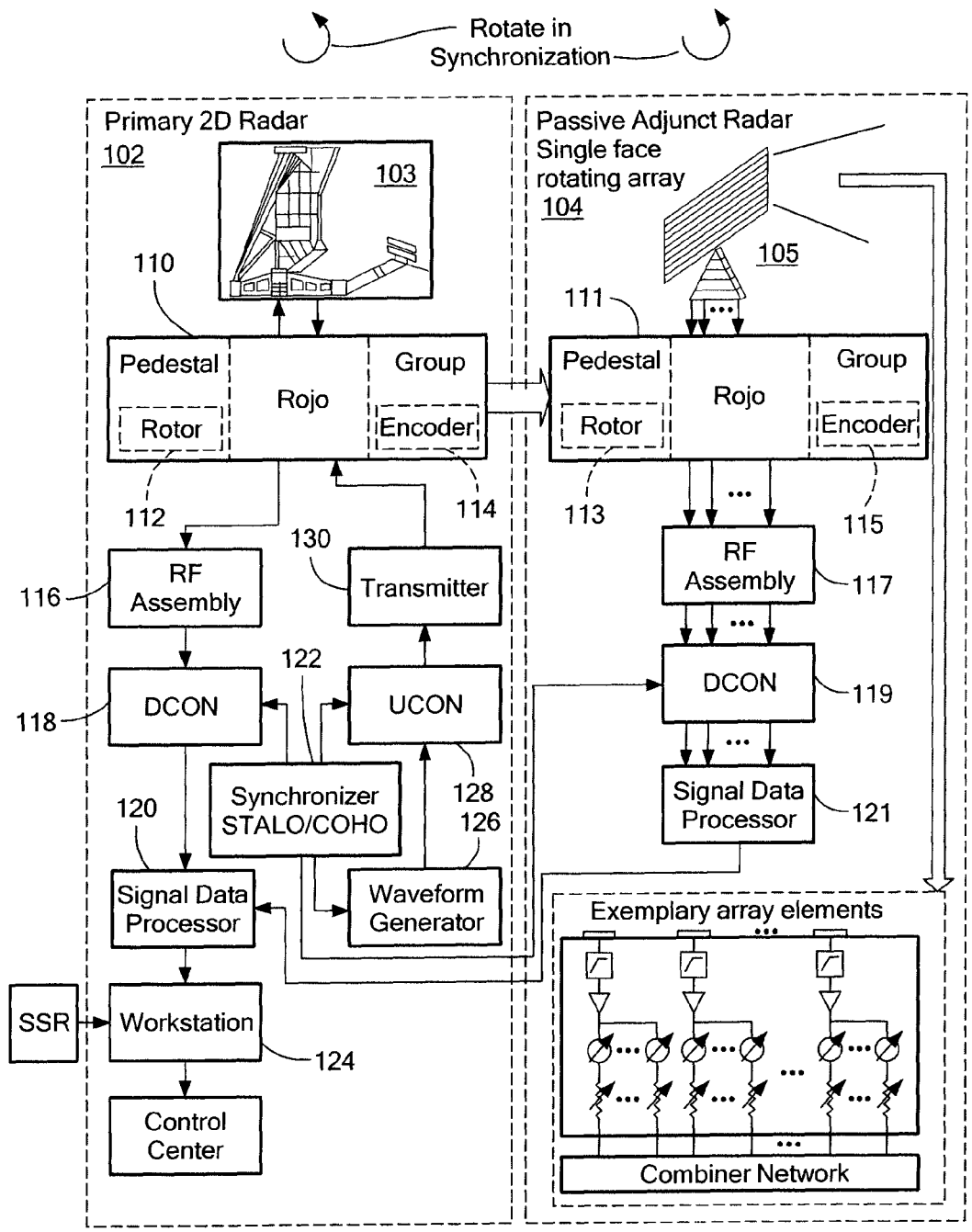
FIG. 2 is a schematic representation showing an exemplary implementation of the system of FIG. 1.

FIG. 2 shows an exemplary implementation of a monostatic configuration of a PSR 102 and a passive adjunct radar 104. In the illustrated embodiment, the passive adjunct radar 104 is synchronized with the primary radar 102 including timing, rotation, etc. The PSR includes a tower having a pedestal 110 with a rotor 112 to control the antenna rotation. An encoder 114 can be coupled to the adjunct radar, as described more fully below.

In the receive path, information from the antenna is provided to a RF assembly 116 and passed to a down converter module 118 in a conventional manner. A signal data processor 120 processes the down-converted information and sends the information to a workstation 124 to facilitate further processing, display, user control, etc. A synchronizer (STALO/COHO) 122 is coupled to the down-converter module 118. The passive adjunct radar 104 has a similar configuration as the PSR except without the transmit path.

In the transmit path, a waveform generator 126 generates a waveform for transmit for an up-converter module 128, which is coupled to the synchronizer 122. A transmitter 130 receives the up-converted waveform and sends it to the antenna via the pedestal 110.

In one embodiment, the passive adjunct radar antenna 105 can be located in a separate tower and pedestal rotating in synchronization with the primary antenna 103. The tower of the adjunct radar antenna should be lower than the primary to avoid blockage. Control signals from the primary radar pedestal 110 feed the control unit of the adjunct radar pedestal 111 to align the two radars to the same azimuth direction while scanning.

In one embodiment, the system sends the encoder 114 data from the primary radar encoder to the passive adjunct radar pedestal 111 control unit. The passive radar rotor control unit accelerates or decelerates the rotor 113 based on a delta signal between the primary radar encoder 114 and the adjunct encoder 115. Any other techniques commonly known by those skilled in the art can be applied to synchronize the rotation of the radars.

The STALO or crystal oscillator and COHO 122 of the primary radar 102 feed the passive adjunct radar to provide a coherence reference signal and timing synchronization. The COHO 122 signal is used to sample and align the data from both radars. The STALO 122 signal is used by both radars to down convert 118, 119 the RF signal to base band or IF signal.

Figure 3:
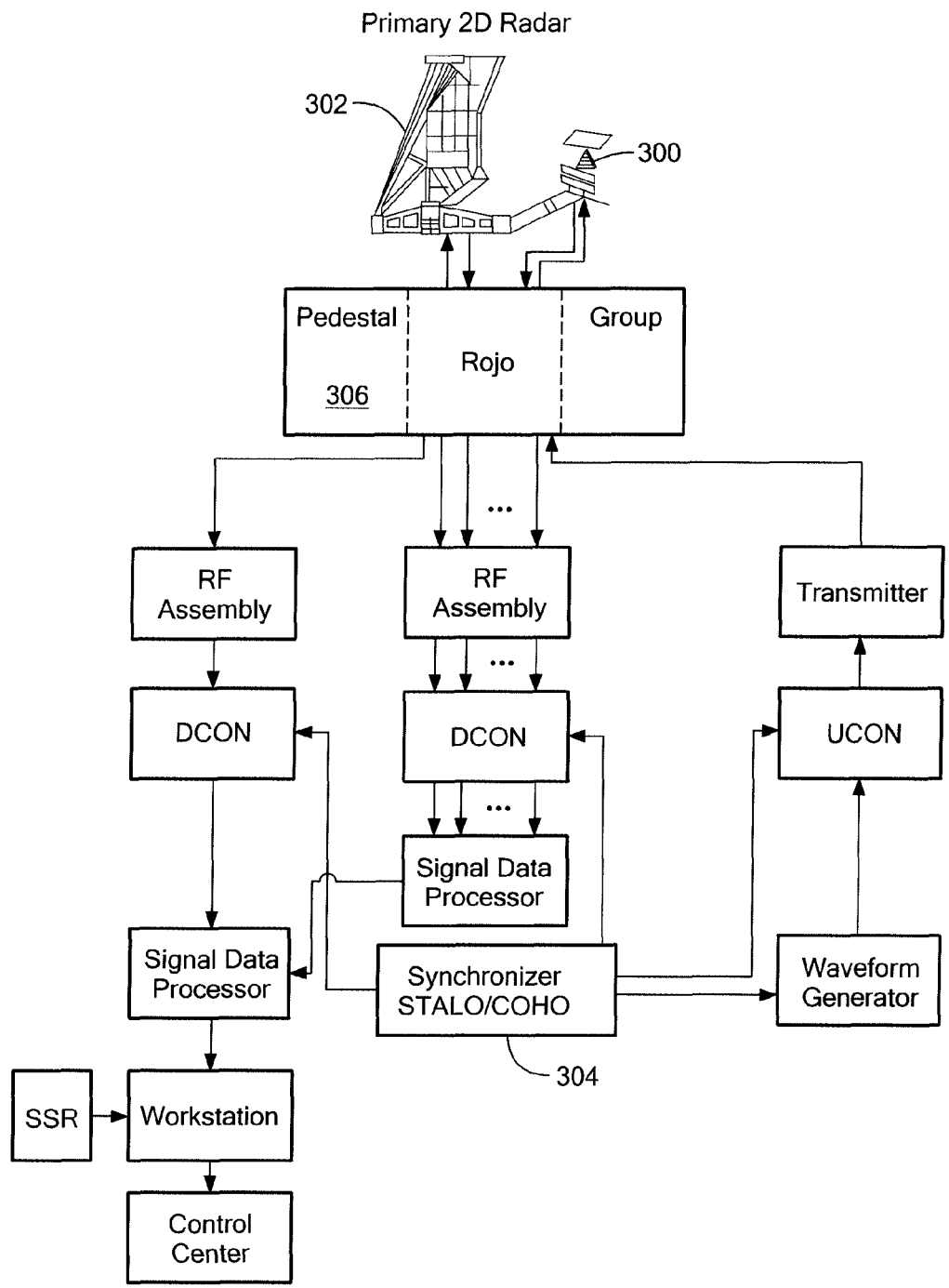
FIG. 3 is a schematic representation of co-located primary and adjunct radars.

In an alternate embodiment shown in FIG. 3, the passive adjunct radar antenna 300 can be co-mounted with the primary radar antenna 302 to achieve rotation synchronization automatically. The STALO or crystal oscillator and COHO 304 of the primary radar feed the passive adjunct radar to provide the coherence reference signal and timing synchronization.

In the illustrative embodiment, the primary and adjunct radars are located on the same pedestal 306. Although a phased array is shown, other radar types can be used, such as a stacked feed horn. In another embodiment, digital beam forming or a Rotman lens can be used for forming the stacked beams in the adjunct radar. In another embodiment, a small-sized phased array can be deployed in combination with the existing reflector. In another embodiment, a full-sized phased array can be mounted on top of the existing reflector to rotate together. In another embodiment, one or two extra feed horns can be added to the existing primary radar antenna. The extra feedhorns can provide higher elevation angle coverage.

Figure 4:
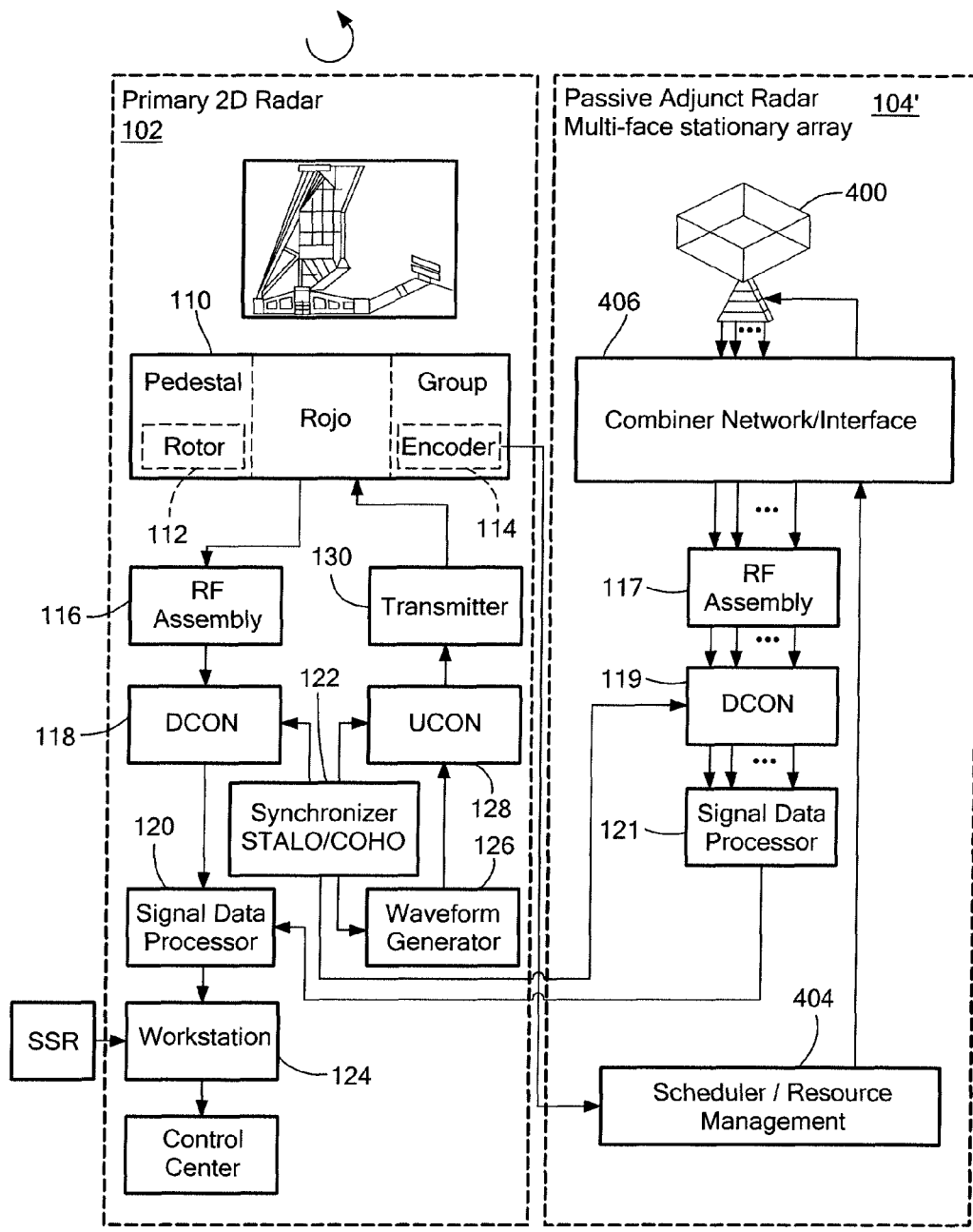
FIG. 4 is a schematic representation of a radar system having an adjunct radar with a multi-faced array.

In another embodiment the adjunct radar antenna can be a multi-faced phased array 400 or conformal (cylindrical) phased array without rotation as shown in FIG. 4. It is understood that like elements from FIG. 2 have like reference numbers.

In an exemplary embodiment, the antenna synchronization can be achieved through electronically chasing the primary antenna scanning beam. The primary radar antenna encoder 114 information is sent to a passive adjunct radar scheduler module 404, which will then direct the array to form receive beams to the same azimuth direction of the primary radar 102. The scheduler module 404 is coupled to a combiner network/interface 406, which is coupled to the antenna 400. In one embodiment, digital beam forming or a Rotman lens can be used for forming the stacked beams in the adjunct radar. In the above embodiments, the adjunct radar is sufficiently close to the primary radar so as to be treated as monostatic operation, which means the transmitter of the primary radar and the receiver of the adjunct radar are co-located.

While a multi-faced phased array is illustrated, a conformal array, such as a cylindrical array can be applied instead.

Figure 5A:
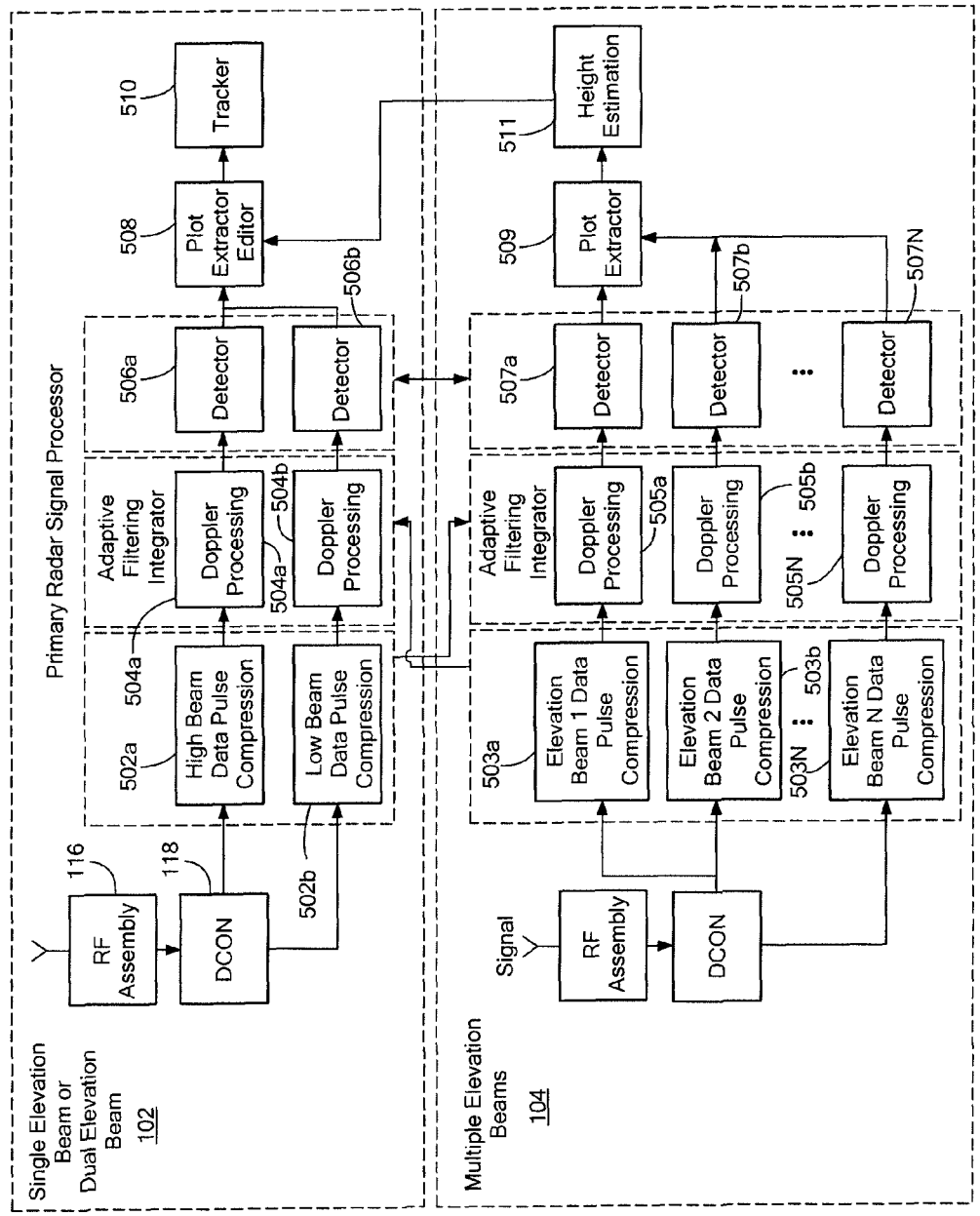
FIG. 5A is a flow diagram to show exemplary processing in the primary and adjunct radars.

FIG. 5A shows exemplary processing of the target data from the primary and the passive adjunct radars 102, 104. Looking first to the primary radar 102, for a single or dual elevation beam, the signal return from the antenna is sent to the RF assembly 116 and down-converter module 118. The down-converted signals are pulse compressed in high beam 502a and low beam 502b, Doppler processed 504a, b optionally using adaptive filtering, detected 506a, b, and plot extracted 508. A tracker module 510 then tracks targets using the plot data.

In a similar manner, the passive adjunct radar 104, for multiple elevation beams, performs elevation beam pulse compression 503a-N (assuming there are N beams), each of which is Doppler processed 505a-N using fixed Doppler filtering bank and/or adaptive filtering, and sent to respective detector modules 507a-N. Data from the detector modules 507 is processed by a plot extractor module 509 and sent to a height estimation module 511. Elevation beam data 503 from the adjunct radar 104 are provided to the Doppler processing 504 of the primary radar 102 for adaptive filtering, as described more fully below. Elevation beam data 503 from the adjunct radar 104 are provided to the Doppler processing 504 of the primary radar 102 for coherent or incoherent (video) integration in PSR signal processing. When the phase relationship between data from PSR and adjunct radar is known, coherent integration can be applied to achieve 3 dB SNR improvements. In coherent integration, pulses from both radars are added in phase. When the phase relationship is unknown, the amplitudes of the Doppler processed data from both PSR and adjunct radar are video integrated to achieve up to 2.5 dB SNR improvements. Any integration techniques commonly known by those skilled in the art can be applied. In a similar way, high and low beam data 502 from PSR 102 are provided to Doppler processor 505 of the adjunct radar 104 for coherent or incoherent (video) integration in adjunct radar signal processing. Alternatively the incoherent integration can also be done in detectors 506 and 507 by combining the alarms from both radars in their own binary integrator. Alternatively the incoherent integration can be achieved in the plot extractor 508 of PSR 102.

The plots from the primary radar 102 and the adjunct radar 104 are then combined and processed as height estimation 511 information is provided to the plot extractor 508. In modern radar, pulse compression techniques are used to lower the transmitter power while keeping the desired coverage and range resolution. The adjunct radar 104 applies the same pulse compression coefficients as the primary radar 102 in that they share the same transmitted waveforms. After the pulse compression, the data are range gated and accumulated over a coherent processing interval (CPI). Pulses over the CPI are integrated with the Doppler processors 504, 505 to improve the signal to noise ratio and sub-clutter visibility. The adjunct radar 104 provides data in the elevation domain. The elevation data from the adjunct radar is combined with the range and azimuth data of the primary radar to provide 3D data for targets and interference.

In the illustrated embodiment, beamforming is done in the analog stage and the adjunct radar 104 provides multiple beamformed data for the Doppler processing and detection. Each beamformed data stream has its own pointing elevation angle. The lower elevation beams are narrow and have a pencil beam shape to better handle both the ground clutter and interference, such as wind turbines. The higher elevation beams can have a wider beam shape to reduce the total number of beams to cover the whole elevation space as shown in FIG. 1. In one embodiment, all ranges have the same beam pattern.

Figure 5B:
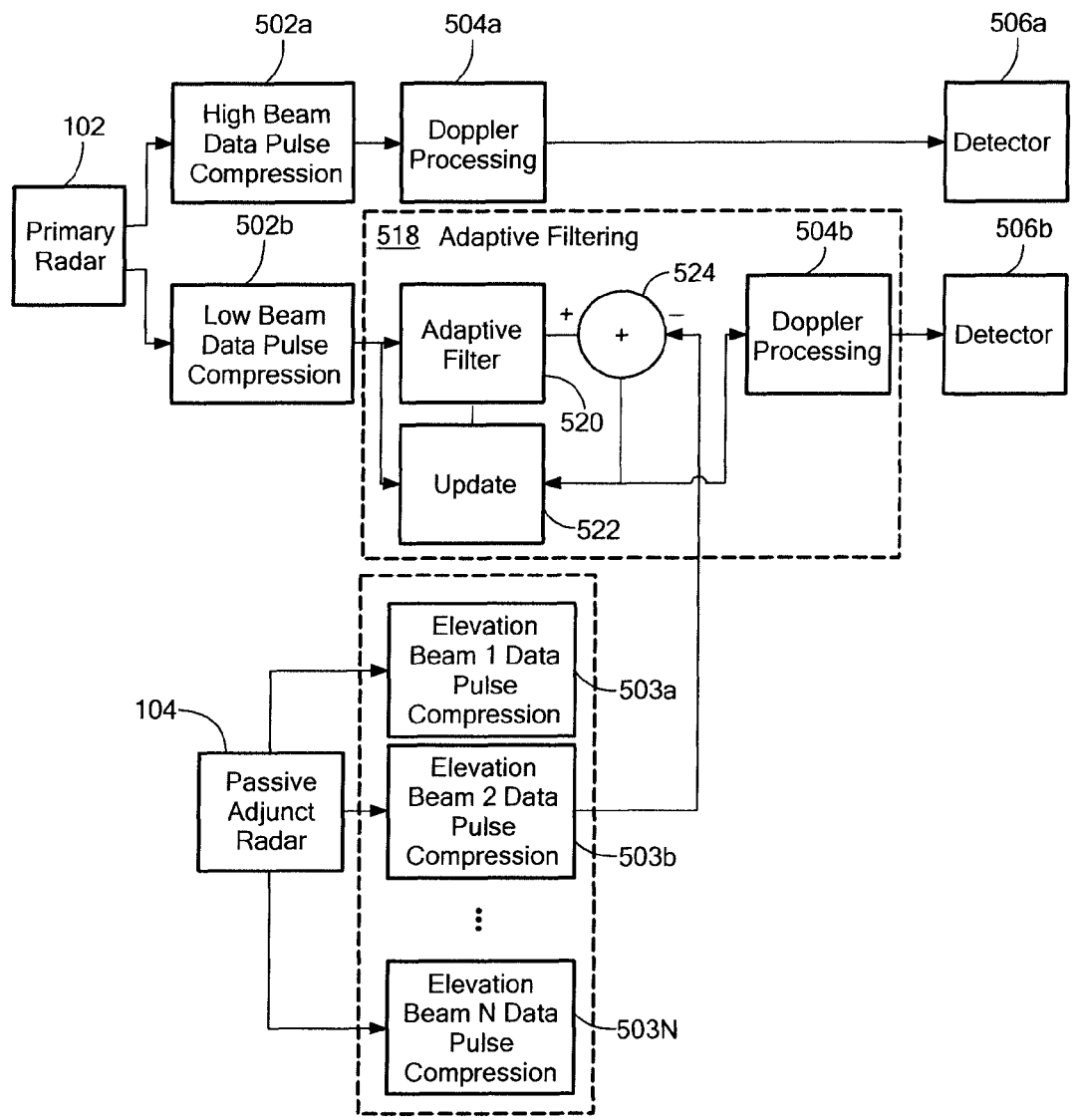
FIG. 5B is a flow diagram to show exemplary adaptive filtering.

As shown in FIG. 5B, the beamformed data 503 from the adjunct radar 104 can be fed back to the primary radar 102 for adaptive filtering 518. The primary radar low beam data 502b contains targets and interference (such as wind turbine), and the adjunct radar 104 provides narrow beam data with interference only. In the adaptive filtering 518, a Wiener filter 520, for example, can be applied as the update module 522. A combiner 524 removes the interference, which is provided by the elevation beam data, from the target and interference data of the primary radar low beam data. The output of the combiner 524, with the interference removed, is provided to the Doppler processor module 504b and detector 506b. In another embodiment, the Doppler processor module 504b can be applied prior to the adaptive filtering.

Figure 5C:
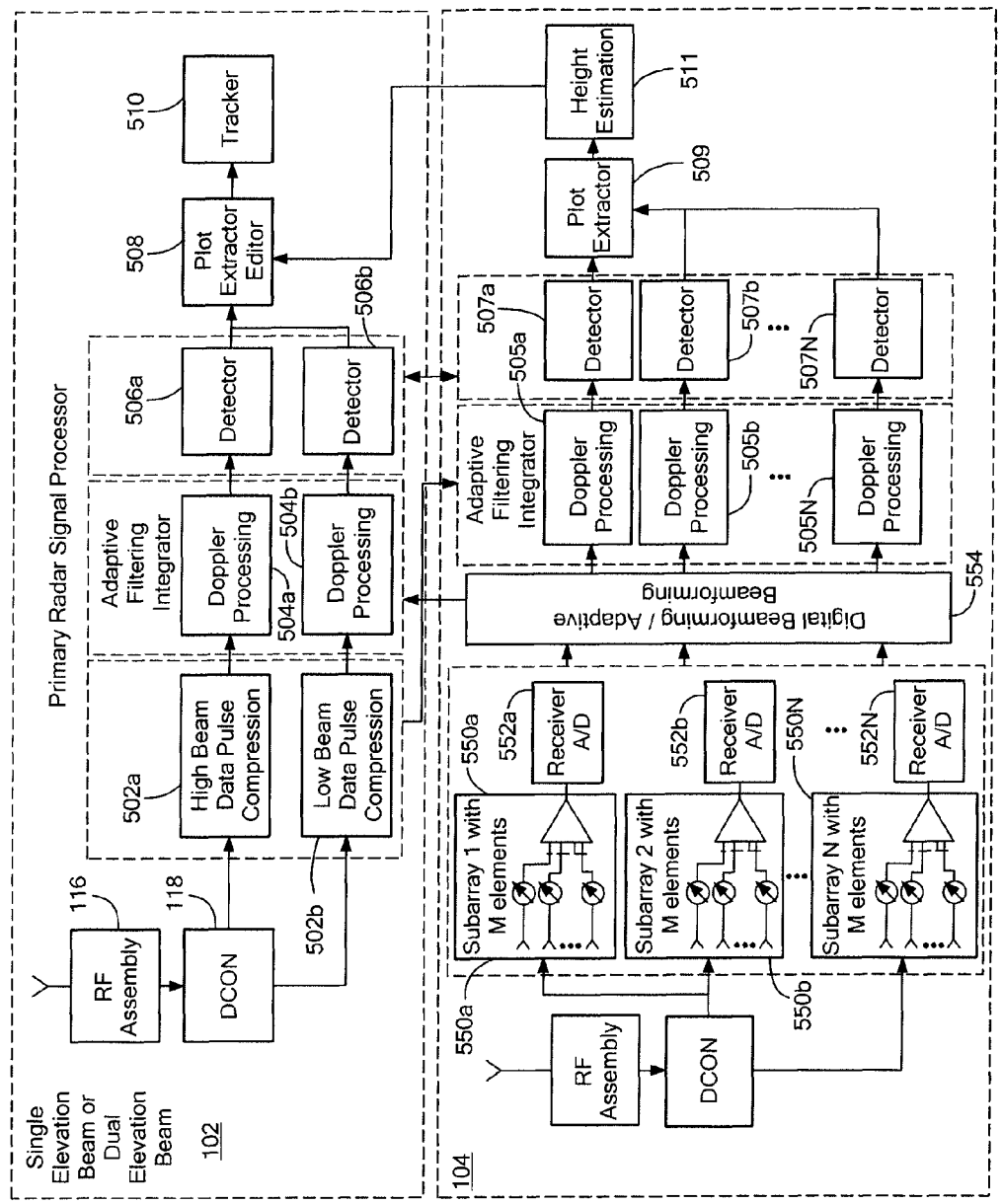
FIG. 5C is a schematic representation of digital beamforming.

In another embodiment as shown in FIG. 5C, digital beamforming can be applied to the outputs of the subarrays 550a-N. Each subarray 550 can have M elements for beamforming in the analog domain to cover the entire elevation space. M can be 1 if element level digital beamforming is affordable. Each subarray 550 has outputs that are digitized via ADCs 552a-N before digital beamforming can be applied. For different ranges, different beamforming coefficients can be applied to better handle the clutter and interference. For example, due to earth curvature, wind turbines at different ranges have different elevation angles. With digital beamforming, each range can have its individual null angle in elevation to suppress the turbines at different range. On the other hand, the beams can be tilted down at ranges of particular interests to better detect low flying targets or surface targets like ships. Digital beamformed data 554 from the adjunct radar 104 are provided to the Doppler processing 504 of the primary radar 102 for coherent or incoherent (video) integration in PSR signal processing. When the phase relationship between data from PSR and adjunct radar is known, coherent integration can be applied to achieve 3 dB SNR improvements. In coherent integration, all pulses from both radars are added in phase. When the phase relationship is unknown, the amplitudes of the Doppler processed data from both PSR and adjunct radar are video integrated to achieve up to 2.5 dB SNR improvements. Any integration techniques commonly known by those skilled in the art can be applied. In a similar manner, high and low beam data 502 from PSR 102 are provided to Doppler processor 505 of the adjunct radar 104 for coherent or incoherent (video) integration in adjunct radar signal processing. Alternatively the incoherent integration can also be done in detectors 506 and 507 by combining the alarms from both radars in their own binary integrator. Alternatively the incoherent integration can be achieved in the plot extractor 508 of PSR 102.

Figure 5D:
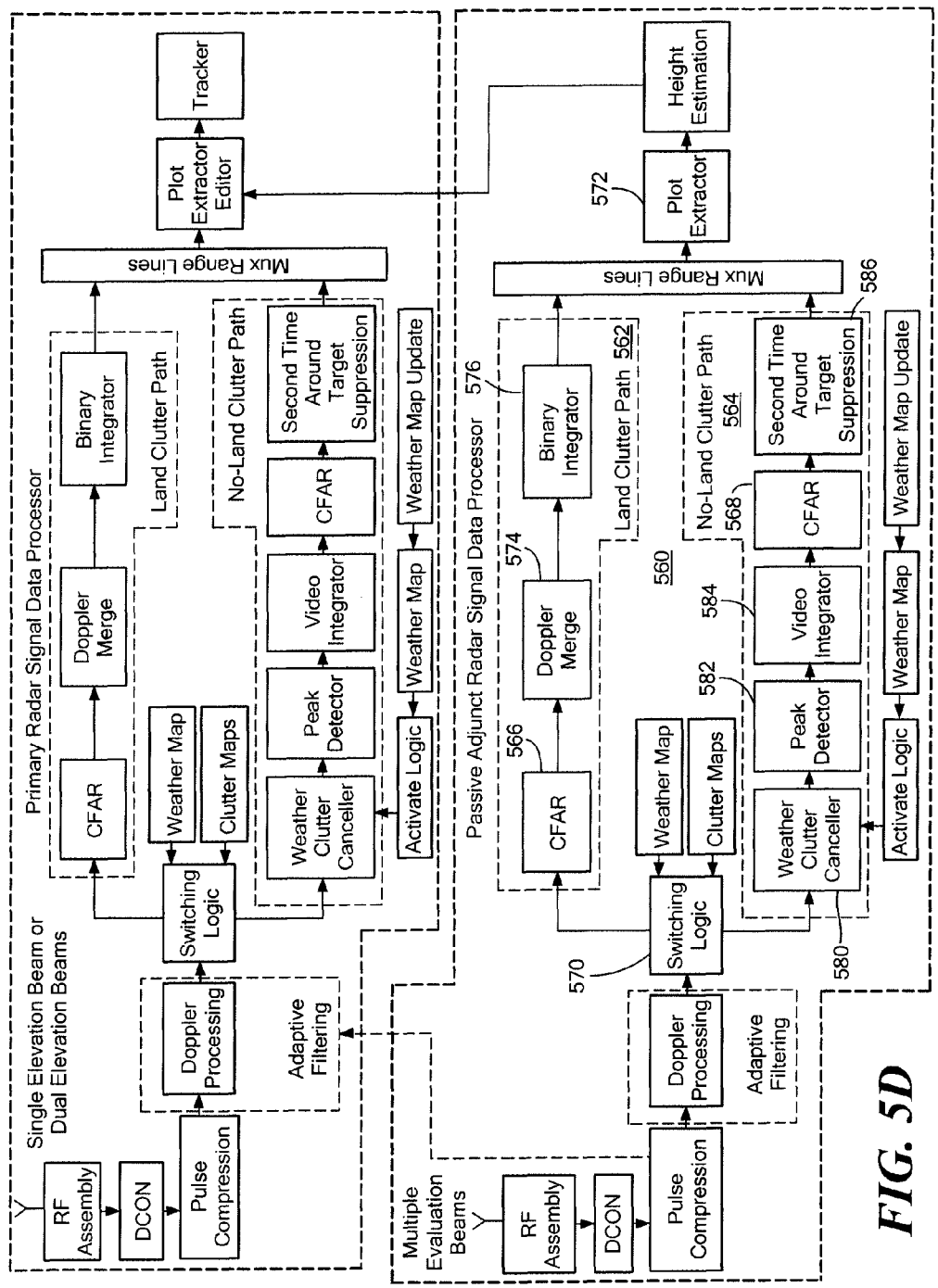
FIG. 5D is a flow diagram to show detailed signal processing.

As shown in FIG. 5D, the detector 560 of the adjunct radar 104 can further contain a land-clutter CFAR path 562 and no-land-clutter CFAR path 564. In one embodiment, a land-clutter CFAR 562 path implements a conventional MTD algorithm, while a no-land-clutter CFAR 564 path adopts a different clutter path, such as that described in U.S. Pat. No. 7,741,992, which is incorporated herein by reference. Selection logic 570 adaptively chooses the output alarms from either path to forward to a plot extractor 572.

In the land-clutter CFAR 562 path, CFARs operate in parallel for Doppler filtered 505 outputs, respectively. A Doppler merge 574 examines each range cell for possible detections among CFARs, and only the detection with the highest amplitude is selected for binary integration 576. The binary integrator 576 correlates the detections from several consecutive CPIs to control false alarms due to clutter or second time around targets. However, there is information loss in the binary integrator 576 in that its inputs are detection results (0 or 1), which results in processing integration gain loss. The no-land-clutter CFAR path 564 achieves an additional 1.7 dB sensitivity which improves detection performance at far range (no land clutter area).

In an exemplary embodiment, the no-land-clutter CFAR processing comprises weather clutter cancellation 580, peak selection 582, video integration 584, CFAR detection 568 and second time around target rejection 586. The general approach for no-land-clutter CFAR 564 processing is to select the maximum power output of the Doppler filters and integrate the results across CPIs prior to CFAR. When there is no clutter, the strongest Doppler filter response represents the target and this response is selected and integrated. The staggering of the PRF can result in a target appearing at different Doppler filter outputs in two consecutive CPIs. However, even if this does occur, the target will be consistently selected by the peak selector 582. This consistent selection of the target makes video integration 584 across CPIs feasible.

Weather clutter can disrupt CFAR processing as strong weather clutter may dominate the Doppler filter outputs and be selected in preference to target returns. To guard against this, the system can adaptively switch in a weather clutter canceller module 580 prior to peak selection 582. The system activates the weather clutter canceller 580 when the weather processor reports weather levels above a preset threshold. When the high speed target is aliased into weather clutter it will be cancelled, however, the PRF staggering helps to move the target away from weather clutter for target detection.

In order to integrate CPIs with different PRF, peak selection 582 examines each range cell for all Doppler filter outputs from the weather clutter canceller 580 to select the maximum power output. The peak-selected output of each range cell is video integrated 584 over consecutive CPIs in a sliding window. The CFAR detector 568 is applied to the video integrated data 584, and prior to plot extraction 572, these detections from second time around targets are removed in 586 by comparing the magnitude of detections reported in consecutive CPIs. The detection source from either land-clutter CFAR 566 or no-land-clutter CFAR 568 is adaptively selected based on the local clutter situation.

The plot outputs from the passive adjunct radar can also be forwarded to the radar signal processor of the primary radar such that surface and low altitude plots can be removed prior to the tracker stage. Alternatively the plots originating from surface and low altitude targets can be processed to form tracks such as those associated with ships, UAVs, and small aircraft.

In one embodiment, the system also includes the ability to provide full height estimation capability for the air traffic control radar which is desirable for tracking targets that do not have transponders, such as aircraft used by drug smugglers and human traffickers, aircraft taken over by terrorists, UAVs and birds. In one embodiment, the system clusters the detections in range, azimuth and elevation, and performs the plot extraction on the 3D cluster to provide the range, azimuth and elevation (height) information for each target.

Figure 6A:
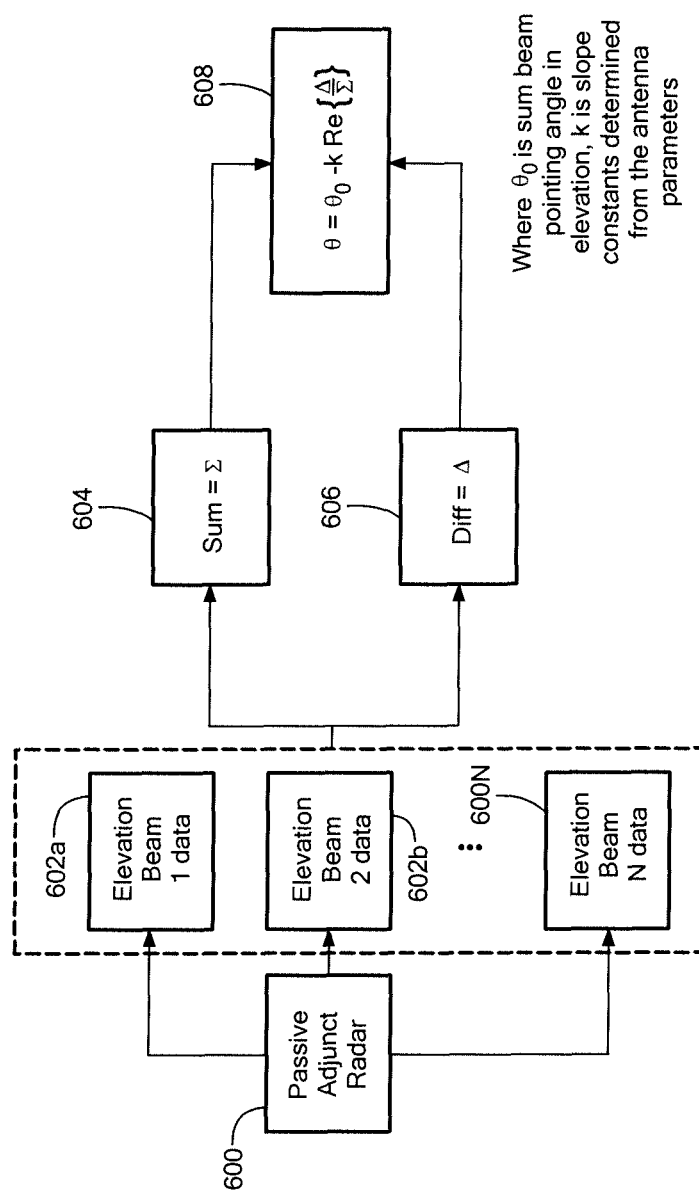
FIG. 6A shows exemplary processing for the adjunct radar for elevation angle estimation.

As shown in FIG. 6A, for elevation estimation in the adjunct radar 600, monopulse processing, for example, can be applied. Assuming the strongest target responses are found in elevation beam n and n+1 of beams 602a-N; the target elevation 608 can be estimated as:

$$\theta = \theta_0 - k\mathrm{Re}\left\{\frac{\Delta}{\Sigma}\right\}$$

where $\theta_0$ is the look angle of sum of beam n and n+1, k is slope constant determined from the antenna parameters in advance, $\Delta$ is the amplitude difference 606 of beam n and beam n+1, $\Sigma$ is the amplitude sum 604 of beam n and beam n+1 and Re{ } represents real part of the complex number. It is understood that other techniques known to one of ordinary skill in the art can be used for generating angle estimation from the delta and sum channels. Also the imaginary part of the delta and sum channel ratio can be used for detecting multipath and multiple targets in the beam.

Figure 6B:
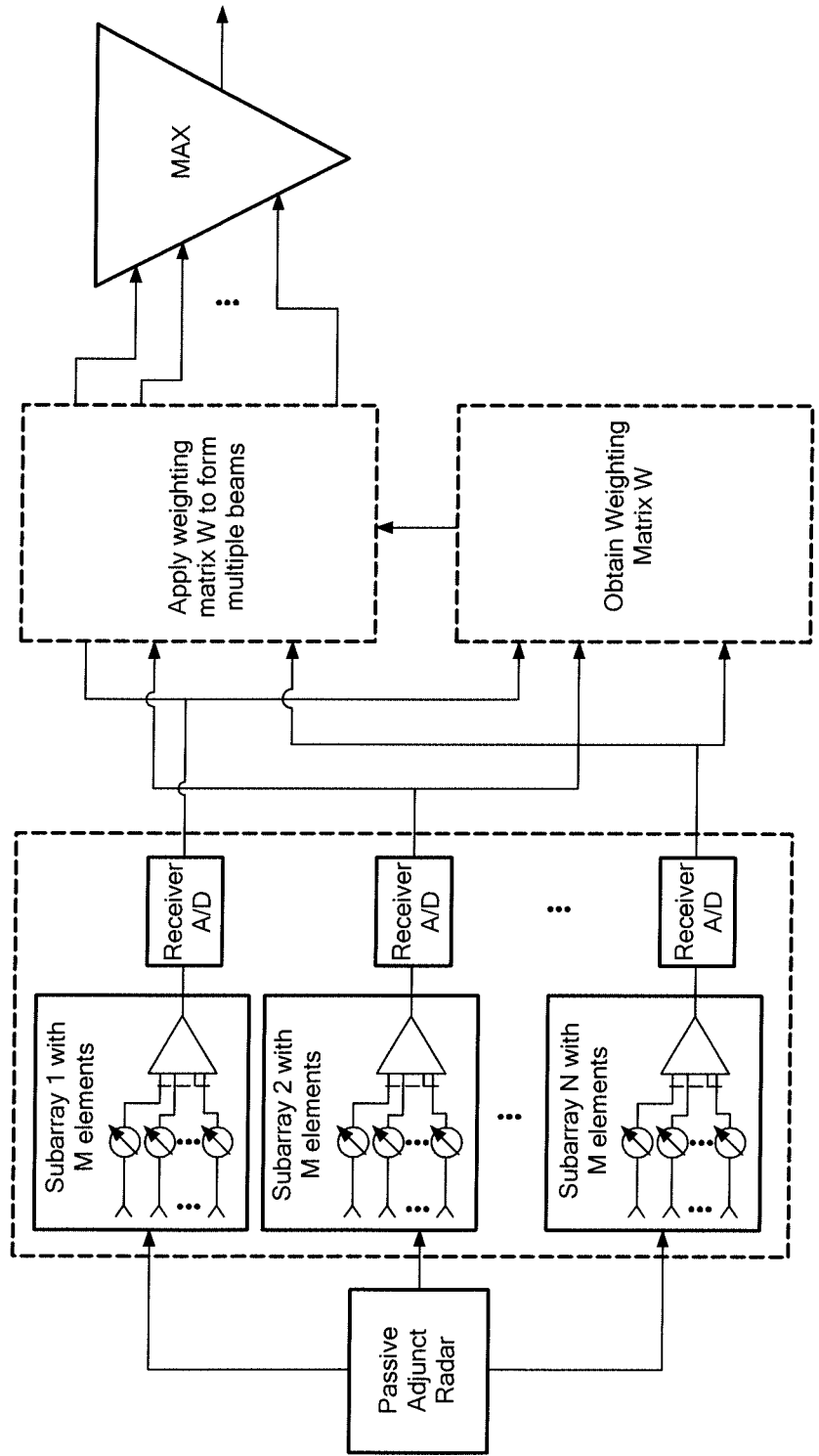
FIG. 6B is a schematic representation to show MLE of the elevation angle in the adjunct radar.

As shown in FIG. 6B, in another embodiment, a maximum likelihood estimator (MLE) can be applied to the digital beamforming at either element level or subarray level for elevation angle estimation. The accuracy of MLE can be significantly better than that from monopulse. Assuming the output of the subarray (or elements when M=1) is X and the covariance of the noise plus interference is R. The subarrays or element have a beam pattern to cover all angles of interests before being digitized. The weighting vector for elevation $\theta_0$ is:

$$w_{\theta_0} = \frac{R^{-1}a^H(\theta_0)}{a^H(\theta_0)R^{-1}a^H(\theta_0)}$$

where $a(\theta_0)$ is the array manifold at $\theta_0$ and $$W=[w_{\theta_1} w_{\theta_2} \ldots w_{\theta_n}].$$

The maximum output power at the end of the beamformer corresponds to the maximum likelihood estimate of the elevation angle.

By using the 3D data, a better weather estimation can be provided to the air traffic control center. The weather processing is performed in parallel with target processing but does not interfere with target processing. The weather processing shares a common waveform, transmitter, and antenna.

Figure 7:
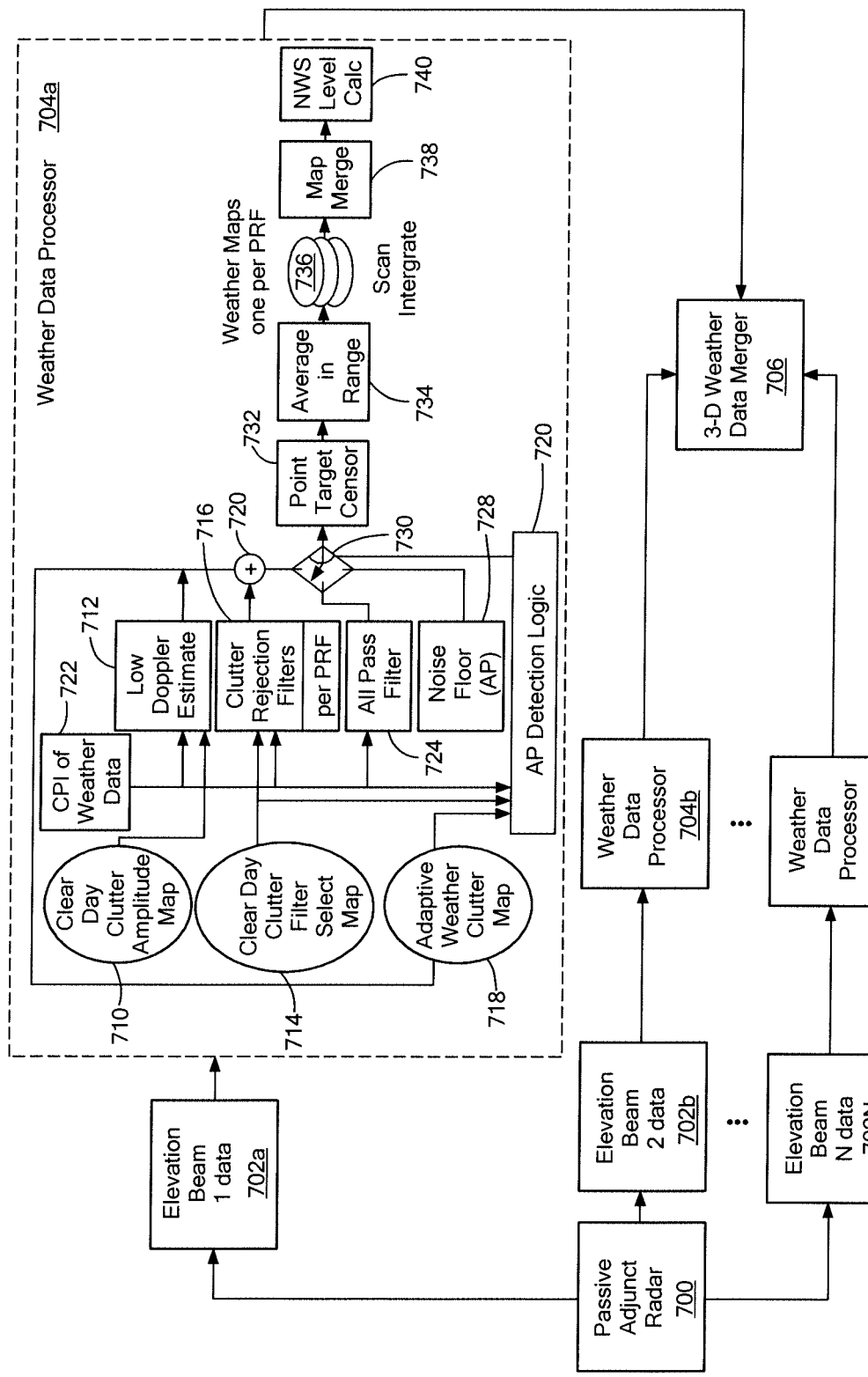
FIG. 7 is a schematic representation to show weather data processing.

Exemplary weather signal processing is shown in FIG. 7. Data from the passive adjunct radar 700 is used for elevation beams 702a-N, which are fed to respective weather data processing modules 704a-N. A first one 704a of the weather processing modules is shown in further detail. The outputs of the weather processing modules 704 are provided to a 3D weather data merge module 706.

An exemplary weather data processor 704 includes a clear day clutter amplitude map 710 coupled to a low Doppler estimate module 712, clear day clutter filter select maps 714 coupled to clutter rejection filters 716, and an adaptive weather clutter map 718 coupled to an AP detection module 720. The clutter amplitude map 710 and clutter filter select maps 714 are also coupled to the AP detection module 720. A CPI of weather data module 722 is coupled to the low Doppler estimate module 712, the clutter rejection filters 716, an all pass filter 724, and the AP detection module 720.

An output of the low Doppler estimate module 712 is provided to the adaptive weather clutter map 718 and to a summer 726, which also receives the output of the clutter rejection filters 716. The outputs of the summer 726, the all pass filter 724, a noise floor module 728, and the AP detection module 720 are provided to a combiner 730, which is coupled to a point target censor module 732. The point target censor module 732 is coupled to an average in range module 734, which is coupled to a weather map module 736. In an exemplary embodiment, the weather maps are one per PRF and scan integrated. A map merge module 738 receives the weather map information 736 and provides an output to a national weather service (NWS) level calculation module 740 to provide information to the 3D weather data merge module 706.

The weather information is mixed with land clutter, anomalous propagation (AP), multi-return targets and point targets in the pulse compressed data. Various weather filters are adaptively applied to suppress the land clutter, AP and multi-return targets before the point target censoring 732 is applied. Clutter rejection filter bank 716, applied to suppress ground clutter, and AP rejection filters in 720, used to suppress ground clutter due to anomalous propagation, help to increase the weather report accuracy and reduce the false alarms significantly. Low Doppler weather 712 compensation is necessary when aggressive clutter rejection filter 716 is applied. Aggressive clutter rejection filter 716 tends to reduce part of the true weather components. The clutter rejection filters 716 are selected by thresholding the clear day clutter maps. The filtered data are sent to point target censoring 732 to remove echoes of aircraft and reduce weather estimation bias from aircraft. After filtering and censoring, the data is averaged 734 and decimated in range to the desired weather range resolution. In order to further control the multi-trip and AP returns, the decimated weather data is accumulated into separate maps 736 for each PRF and carrier frequency over a predetermined number of scans before they are merged into the final weather map 738. The merged map is then compared with the NWS thresholds 740 to convert into one of the six NWS levels. The original NWS thresholds are adjusted based on actual radar operation parameters and beamforming factor before comparison. The weather data processing is applied to each of the elevation beams 702. The adjustment parameters are optimized for each beam and the final results are merged into 3-D weather vectors 706.

In exemplary embodiments of the invention, a system can simultaneously address multiple windfarms which are geographically separated from one and another but within the primary radar coverage. In one embodiment, one system covers all these wind farms simultaneously with a co-located passive adjunct radar, which is cost effective.

Figure 8:
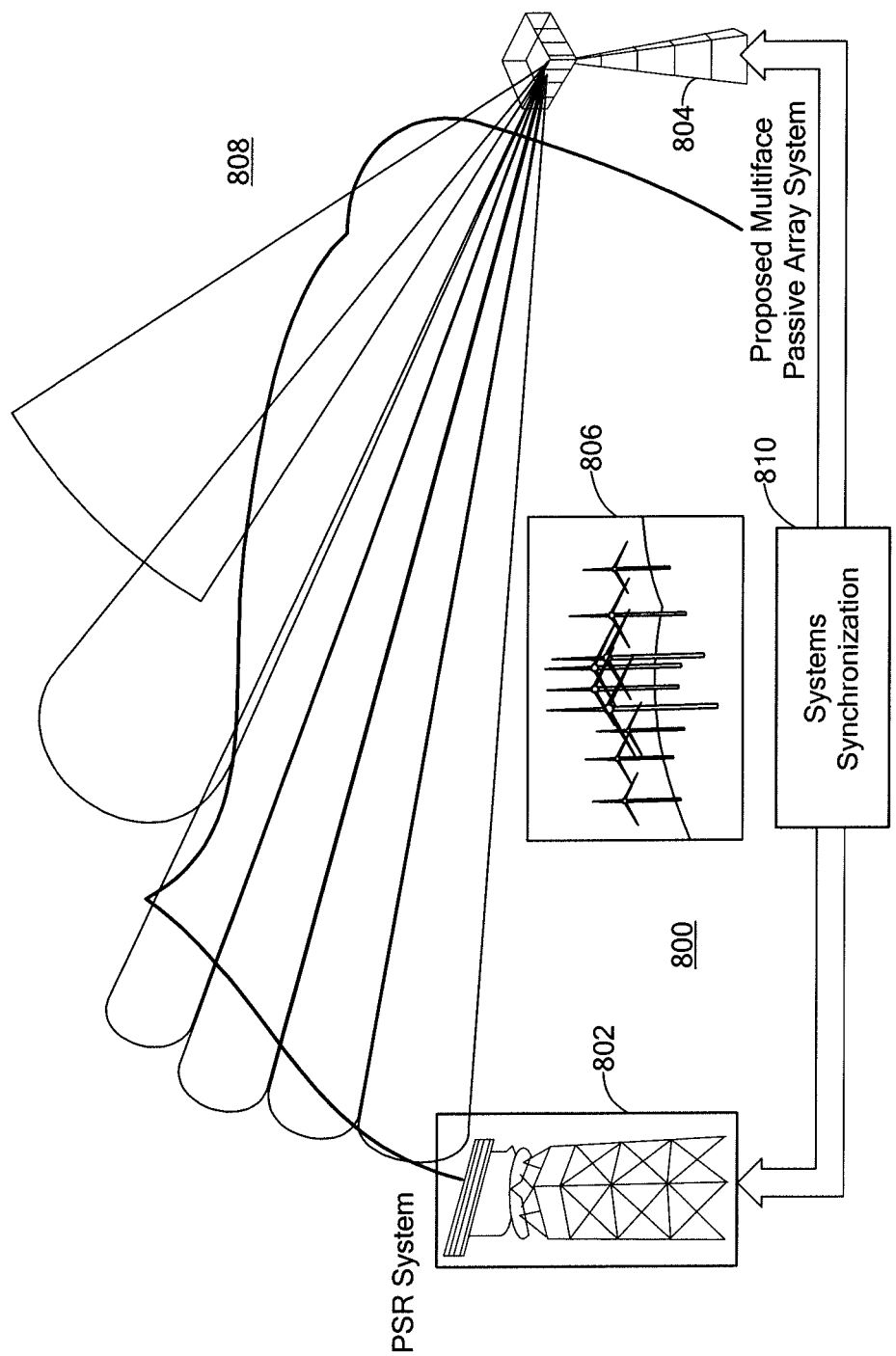
FIG. 8 is a schematic representation of a system having a primary radar and a passive adjunct radar in a bi-static arrangement.

FIG. 8 shows a bistatic system 800 having a primary surveillance radar 802 and a passive adjunct radar system 804 in accordance with exemplary embodiments of the invention. The adjunct radar 804 is located relatively close to the area of interest 806, e.g., windfarm, within a surveillance area 808. Synchronization information is transferred between the adjunct radar 804 and the primary radar 802 via a system synchronization module 810. An exemplary embodiment includes the use of GPS information to synchronize the primary and adjunct radars.

Figure 9:
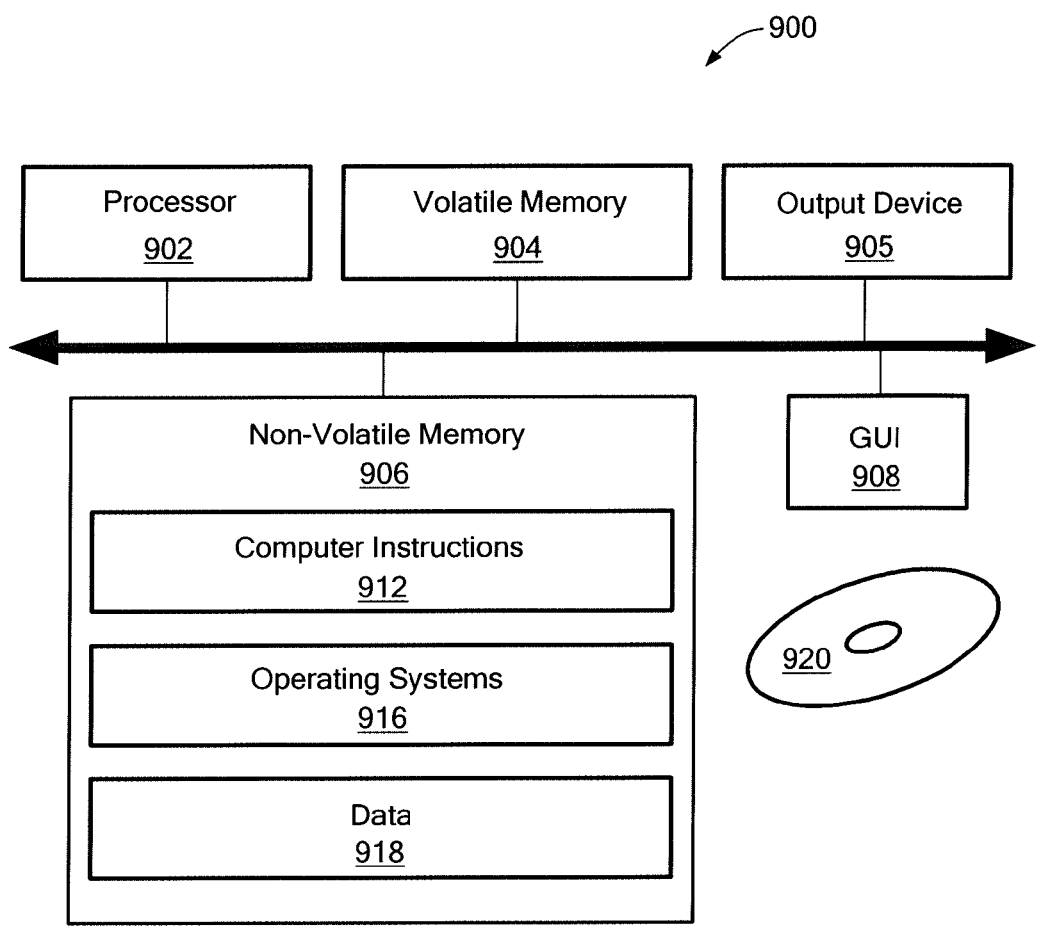
FIG. 9 is a schematic representation of an exemplary computer that can perform at least a portion of the processing described herein.

FIG. 9 shows an exemplary computer 900 that can perform at least part of the processing described herein. The computer includes a processor 902, a volatile memory 904, a non-volatile memory 906 (e.g., hard disk), AND a graphical user interface (GUI) 908 (e.g., a mouse, a keyboard, a display, for example). The non-volatile memory 906 stores computer instructions 912, an operating system 916 and data 918 including the Q files, for example. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of; data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   transmitting radar signals using a two-dimensional primary radar to cover a surveillance area;
   receiving return from the transmitted radar signals at the primary radar;
   performing high beam and low beam pulse compression on the received return to provide high beam data and low beam data;
   receiving return from the transmitted radar signal at a passive adjunct radar comprising elevation beam data;
   synchronizing the primary radar and the adjunct radar;
   combining range and azimuth data from the primary radar with elevation data from the adjunct radar to provide three-dimensional data for targets and weather; and
   integrating data from the primary radar with data from adjunct radar to improve coverage of the radar.

2. The method according to claim 1, wherein the low beam data comprises targets and interference and wherein some elevation beam data contains interference and not targets; performing adaptive filtering of the low beam data and the elevation beam data to remove the interference.

3. The method according to claim 2, wherein the interference is generated by a wind farm.

4. The method according to claim 1, providing capability to simultaneously detect and track surface, low flying and air targets.

5. The method according to claim 1, further including using a land clutter path and a no-land clutter path for the elevation beam data.

6. The method according to claim 5, wherein the land-clutter path includes CFAR processing.

7. The method according to claim 5, further including adaptively using weather clutter cancellation in the no-land clutter path.

8. The method according to claim 1, further including aligning the primary radar and the adjunct radar to the same azimuth while scanning.

9. The method according to claim 1, further including performing height estimation for a target using the elevation beam data.

10. The method according to claim 9, further including performing monopulse processing for the height estimation.

11. The method according to claim 9, further including performing maximum likelihood estimation for the height estimation.

12. The method according to claim 1, further including performing 3D weather estimation using the adjunct radar data.

13. The method according to claim 1, wherein the primary radar and the adjunct radar are located to form a bistatic configuration.

14. An article, comprising:
    a computer-readable medium containing non-transitory stored instructions that enable a machine to perform:
    transmitting radar signals using a two-dimensional primary radar to cover a surveillance area;
    receiving return from the transmitted radar signals at the primary radar;
    performing high beam and low beam pulse compression on the received return to provide high beam data and low beam data;
    receiving return from the transmitted radar signal at a passive adjunct radar comprising elevation beam data;
    synchronizing the primary radar and the adjunct radar;
    combining range and azimuth data from the primary radar with elevation data from the adjunct radar to provide three-dimensional data for targets and weather; and
    integrating data from the primary radar with data from adjunct radar to improve coverage of the radar.

15. The article according to claim 14, wherein the low beam data comprises targets and interference and wherein some elevation beam data contains interference and not targets.

16. The article according to claim 15, further including instructions for performing adaptive filtering of the low beam data and the elevation beam data to remove the interference.

17. The article according to claim 14, further including instructions for using a land clutter path and a no-land clutter path for the elevation beam data.

18. The article according to claim 17, further including adaptively using weather clutter cancellation in the no-land clutter path.

19. The article according to claim 14, further including instructions for aligning the primary radar and the adjunct radar to the same azimuth while scanning.

20. A radar system, comprising:
    a two-dimensional primary radar to cover a surveillance area by transmitting radar signals;
    an antenna to receive return from the transmitted radar signals at the primary radar;
    an adjunct radar having antenna to receive return from the transmitted radar signal comprising elevation beam data;
    a processor; and
    a memory coupled to the processor, the processor and the memory configured to:
    synchronize the primary radar and the adjunct radar;

perform high beam and low beam pulse compression on the received return to provide high beam data and low beam data;

combine range and azimuth data from the primary radar with elevation data from the adjunct radar to provide three-dimensional data for targets and weather; and integrate data from the primary radar with data from adjunct radar to improve coverage of the radar.

\* \* \* \* \*